(12) United States Patent
Steele, Jr.

(10) Patent No.: US 7,003,540 B2
(45) Date of Patent: Feb. 21, 2006

(54) FLOATING POINT MULTIPLIER FOR DELIMITED OPERANDS

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 586 days.

(21) Appl. No.: 10/035,674

(22) Filed: Dec. 28, 2001

(65) Prior Publication Data

US 2002/0178202 A1    Nov. 28, 2002

Related U.S. Application Data

(60) Provisional application No. 60/293,173, filed on May 25, 2001.

(51) Int. Cl.
G06F 7/44 (2006.01)

(52) U.S. Cl. .................................................. 708/503
(58) Field of Classification Search ................ 708/503, 708/495, 497, 498
See application file for complete search history.

(56) References Cited

U.S. PATENT DOCUMENTS

| | | | |
|---|---|---|---|
| 3,725,649 A * | 4/1973 | Deerfield .................... | 708/503 |
| 4,777,613 A | 10/1988 | Shahan et al. | |
| 4,788,655 A | 11/1988 | Nakayama et al. | |
| 4,991,131 A * | 2/1991 | Yeh et al. .................... | 708/501 |
| 5,065,352 A | 11/1991 | Nakano | |
| 5,126,963 A | 6/1992 | Fukasawa | |
| 5,161,117 A | 11/1992 | Waggener, Jr. | |
| 5,249,149 A | 9/1993 | Cocanougher et al. | |
| 5,307,303 A | 4/1994 | Briggs et al. | |
| 5,347,481 A | 9/1994 | Williams | |
| 5,347,482 A | 9/1994 | Williams | |
| 5,357,237 A * | 10/1994 | Bearden et al. ............. | 708/505 |
| 5,363,321 A | 11/1994 | Dao Trong et al. | |
| 5,365,465 A | 11/1994 | Larson | |
| 5,481,489 A | 1/1996 | Yanagida et al. | |
| 5,570,310 A | 10/1996 | Smith | |
| 5,666,301 A * | 9/1997 | Makino ....................... | 708/620 |
| 5,748,516 A | 5/1998 | Goddard et al. | |
| 5,812,439 A | 9/1998 | Hansen | |
| 5,862,066 A | 1/1999 | Rossin et al. | |
| 5,892,697 A | 4/1999 | Brakefield | |
| 5,931,943 A | 8/1999 | Orup | |
| 5,953,241 A | 9/1999 | Hansen et al. | |
| 5,963,461 A | 10/1999 | Gorshtein et al. | |
| 5,978,901 A | 11/1999 | Luedtke et al. | |
| 5,995,991 A | 11/1999 | Huang et al. | |
| 6,009,511 A | 12/1999 | Lynch et al. | |
| 6,049,865 A * | 4/2000 | Smith .......................... | 708/496 |
| 6,081,823 A | 6/2000 | Purcell et al. | |
| 6,105,047 A | 8/2000 | Sharangpani et al. | |

(Continued)

OTHER PUBLICATIONS

U.S. Appl. No. 10/320,547, filed Dec. 17, 2002, Steele, Jr.

(Continued)

Primary Examiner—Kakali Chaki
Assistant Examiner—Chat C. Do
(74) Attorney, Agent, or Firm—Finnegan, Henderson, Farabow, Garrett & Dunner, L.L.P.

(57) ABSTRACT

A method for providing a floating point product consistent with the present invention includes multiplying a subprecise operand and a non-subprecise operand using a plurality of intermediate stages. The method further includes correcting an error introduced by the subprecise operand by performing an operation in conjunction with a one of the plurality of intermediate stages utilizing a compensating summand.

18 Claims, 7 Drawing Sheets

U.S. PATENT DOCUMENTS

| | | | |
|---|---|---|---|
| 6,108,772 | A | 8/2000 | Sharangpani |
| 6,131,106 | A | 10/2000 | Steele, Jr. |
| 6,138,135 | A | 10/2000 | Karp |
| 6,151,669 | A | 11/2000 | Huck et al. |
| 6,189,094 | B1 | 2/2001 | Hinds et al. |
| 6,205,460 | B1 * | 3/2001 | Steele, Jr. ............ 708/495 |
| 6,219,685 | B1 | 4/2001 | Story |
| 6,256,655 | B1 * | 7/2001 | Ezer et al. ............ 708/501 |
| 6,286,023 | B1 | 9/2001 | Purcell et al. |
| 6,286,024 | B1 | 9/2001 | Yano et al. |
| 6,360,189 | B1 * | 3/2002 | Hinds et al. ............ 708/501 |
| 6,393,555 | B1 | 5/2002 | Meier et al. |
| 6,490,607 | B1 | 12/2002 | Oberman |
| 6,571,265 | B1 | 5/2003 | Story |
| 6,594,681 | B1 | 7/2003 | Prabhu |
| 6,629,120 | B1 | 9/2003 | Walster et al. |
| 6,658,443 | B1 | 12/2003 | Walster |
| 6,658,444 | B1 | 12/2003 | Walster et al. |
| 6,697,832 | B1 * | 2/2004 | Kelley et al. ............ 708/501 |
| 6,732,134 | B1 | 5/2004 | Rosenberg et al. |
| 6,789,098 | B1 | 9/2004 | Dijkstra |
| 2002/0194232 | A1 | 12/2002 | Walster |
| 2003/0033335 | A1 | 2/2003 | Walster |

OTHER PUBLICATIONS

U.S. Appl. No. 10/320,450, filed Dec. 17, 2002, Steele, Jr.
U.S. Appl. No. 10/028,375, filed Dec. 28, 2001, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
Title: "Safe Treatment of Overflow and Underflow Conditions", by Robert A. Fraley & J. Stephen Walther, Hewlett-Packard Co., pp. 1-5.
Title: "Vax Floating Point: A Solid Foundation for Numerical Computation", by Mary Payne & Dileep Bhandarkar, Digital Equipment Corp., pp. 1-12.
Title: Lecture Notes on the Status of "IEEE Standard 754 for Binary Floating-Point Arithmetic", by Prof. W. Kahan, May 31, 1996, pp. 1-30.
Title: "Interval Arithmetic Specification" by Dmitri Chirlaev & G. William Walster, Draft revised May 4, 1998, pp. 1-78.
Title: "IEEE Standard for Binary Floating-Point Arithmetic IEEE Standard 754-1985," by Standards Committee of the IEEE Computer Society, The Institute of Electrical And Electronics Engineers, Inc., copyright 1985, pp. 1-14.

* cited by examiner

FLOATING POINT MULTIPLIER FOR DELIMITED OPERANDS

Applicant claims the right of priority based on U.S. Provisional Patent Application No. 60/293,173 filed May 25, 2001 in the name of Guy L. Steele, Jr.

RELATED APPLICATIONS

Related U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, is hereby incorporated by reference.

FIELD OF THE INVENTION

The invention relates generally to systems and methods for performing floating point multiplication, and more particularly to systems and methods for performing floating point multiplication with delimited operands.

BACKGROUND OF THE INVENTION

U.S. Pat. No. 6,131,106 discloses a delimited representation for floating-point numbers. The basic concept is to introduce an alternate representation for floating-point numbers that can be processed more rapidly by hardware arithmetic units. The operations are carried out in such a way that the semantics of IEEE 754 arithmetic are obeyed exactly, with the only difference being the choice of bit patterns used to represent the values.

An alternate representation, which is call the "delimited representation," is similar to that of IEEE 754 in using a 32-bit format, which is likewise divided into three fields: the sign bit comprising 1 bit; an exponent comprising 8 bits; and a significand comprising 3 bits. For Positive Infinity, Negative Infinity, Not-a-Number, and fully precise values, the delimited representation uses the same bit patterns as IEEE 754 double format, giving the same meanings to those bit patterns. The difference lies in the representation of subprecise values.

With the delimited representation of subprecise values, if the exponent field contains the binary pattern 00000000, then the entire 32-bit pattern represents a numerical value in a "delimited" format. In using the "delimited format", the following steps may be employed. First, construct a 24-bit pattern whose most significant bit is 1 and whose other 23 bits are equal to the 23-bit fraction. Next, locate the rightmost 1-bit in this pattern. For example, suppose that there are k 0-bits to the right of this rightmost 1-bit in the pattern (k will range from 0 to 23, inclusive). Then, construct a second 24-bit pattern equal to the first one except that the rightmost 1-bit in the pattern is changed to be a 0-bit. Regard this second 24-bit pattern as representing an unsigned binary integer m less than $2^{24}$ in the customary form. The magnitude of the numerical value represented is equal to $m*2^{(-150-k)}$, with a positive sign if the sign bit is 0 or with a negative sign if the sign bit is 1.

It may be observed that this "delimited" format for representing subprecise values has the property that the significand is normalized and uses a hidden bit. This is the key property that allows numbers in this format to be processed rapidly. Its representation of the significand for subprecise values, however, is not very different from that used for fully precise values.

A problem exists with the representation that the delimiting 1-bit is not a significant bit, requiring arithmetic hardware to avoid treating it as a significant bit. Specifically, this presents a problem for the design of floating point multipliers. A typical multiplier circuit for IEEE 754 arithmetic consists of a multiplier array and some surrounding logic that performs exponent computations, tests for overflow and underflow, handles exceptional cases such as NaN inputs or the case of zero times infinity. Because the multiplier array has a large time delay, the general strategy is to push the fractions of the two inputs into the multiplier array as soon as possible, then perform the exponent calculations and checking of special cases in parallel. In addition, a multiplexer is used to decide whether to gate the output of the multiplier array to the fraction part of the floating-point result.

With the delimited representation, if the fraction parts of the inputs are put directly into the multiplier array and if one of the inputs is subprecise, then the delimiter 1-bit will be treated as a significant bit and the product will be incorrect. On the other hand, logic to remove the delimiter bit before the operand is put into the multiplier array will incur a significant and undesirable additional time delay.

Therefore, there is a need in the art to calculate products correctly even if an input contains a nonsignificant delimiter bit while avoiding part or all of the time delay that would be required to remove the delimiter bit before computing the product.

SUMMARY OF THE INVENTION

In accordance with the current invention, a method and system for providing a floating point product are provided that avoid the problems associated with prior art systems and methods for performing floating point multiplication as discussed herein above.

In one aspect, a method for providing a floating point product consistent with an exemplary embodiment of the present invention comprises multiplying a subprecise operand and a non-subprecise operand using a plurality of intermediate stages and correcting an error introduced by the subprecise operand by performing an operation in conjunction with a one of the plurality of intermediate stages utilizing a compensating summand.

In another aspect, a system for providing a floating point product consistent with an exemplary embodiment of the present invention comprises a multiplying circuit for multiplying a subprecise operand and a non-subprecise operand using a plurality of intermediate stages, wherein an error introduced by the subprecise operand is corrected by performing an operation in conjunction with a one of the plurality of intermediate stages utilizing a compensating summand.

In yet another aspect, a computer-readable medium on which is stored a set of instructions consistent with an exemplary embodiment of the present invention for providing a floating point product, which when executed perform stages comprising multiplying a subprecise operand and a non-subprecise operand using a plurality of intermediate stages and correcting an error introduced by the subprecise operand by performing an operation in conjunction with a one of the plurality of intermediate stages utilizing a compensating summand.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DESCRIPTION OF THE EMBODIMENTS

Figure 1:
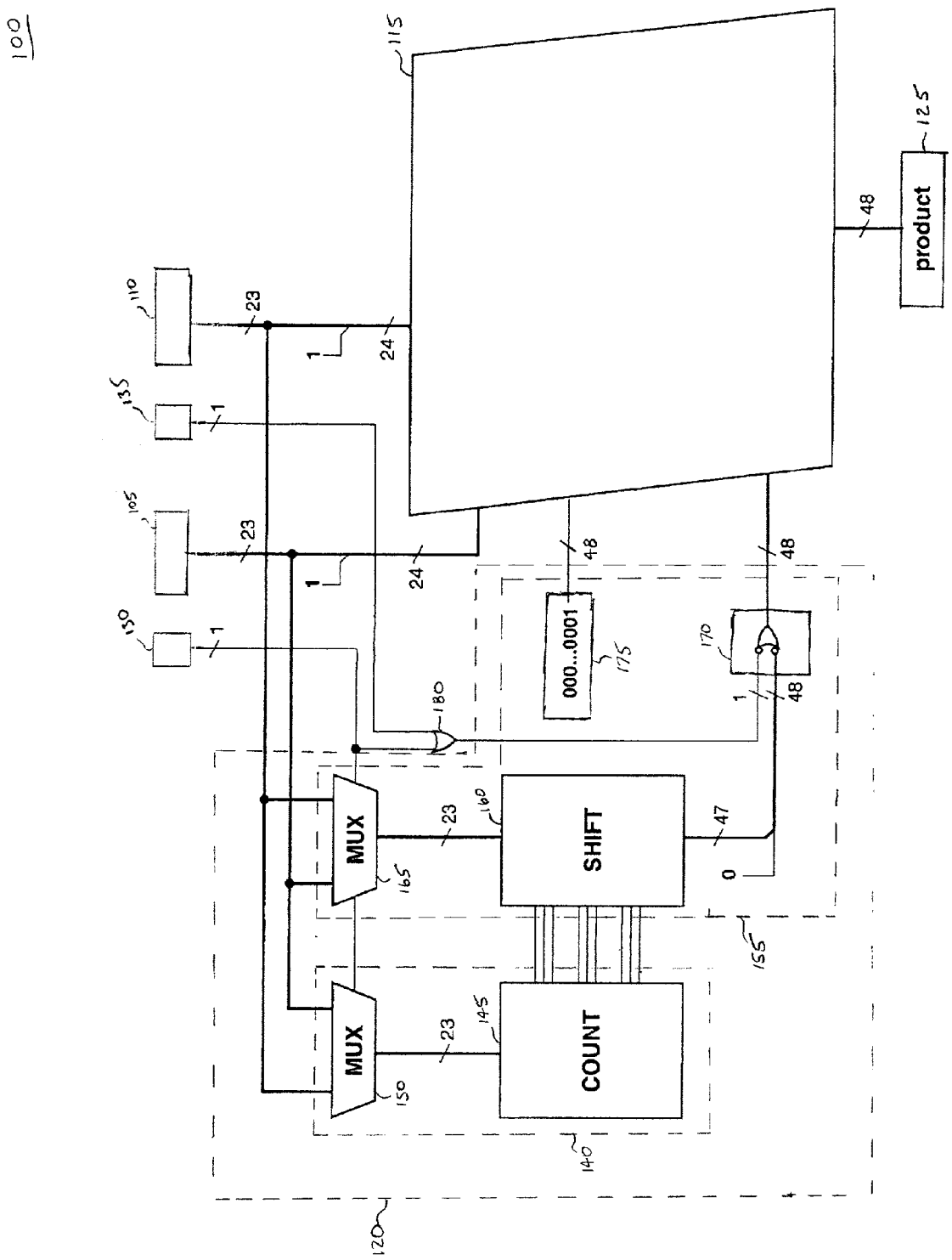
FIG. 1 is a functional block diagram of an exemplary system for providing a floating point product consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

System for Providing a Floating Point Product

Figure 2:
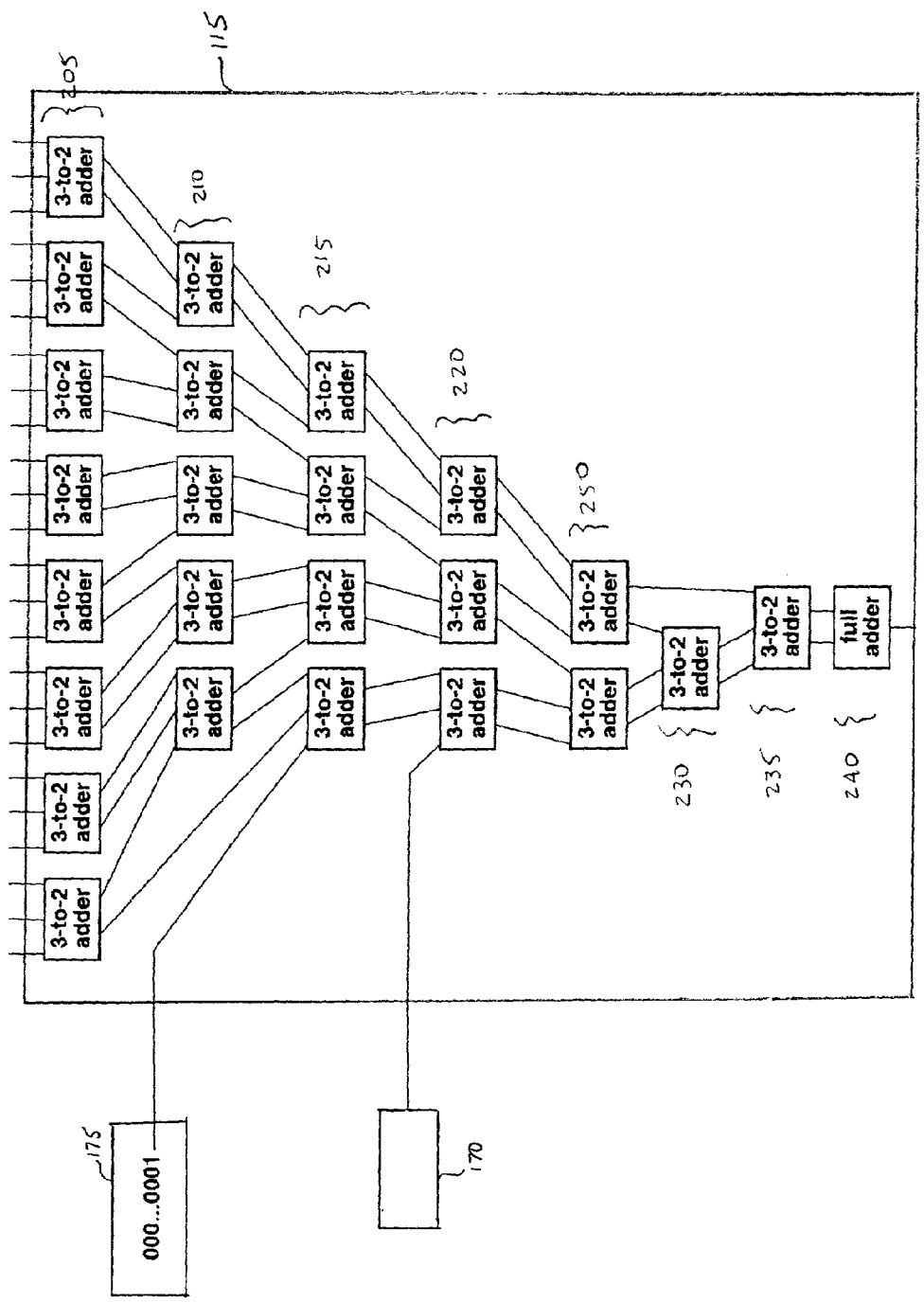
FIG. 2 is a functional block diagram of an exemplary multiplying circuit consistent with an embodiment of the present invention.

FIG. 1 is a functional block diagram of a system for providing a floating point product 100 constructed in accordance with an exemplary embodiment of the present invention. The system 100 comprises a multiplying circuit for multiplying a subprecise operand and a non-subprecise operand 115 using a plurality of intermediate stages 205–235 (FIG. 2). Within system 100, an error introduced by the subprecise operand may be corrected by performing an operation in conjunction with a one of the plurality of intermediate stages 205–235 utilizing a compensating summand. The subprecise operand may be represented using a delimited normalized format with an implicit leading 1-bit. The delimited subprecise format is described in U.S. Pat. No. 6,131,106 which is incorporated herein by reference.

Multiplying circuit 115 may comprise a conventional unsigned-binary-fraction multiplier array that is modified to accept two additional summands. Multiplying circuit 115 may accept a significand held in a first operand buffer 105 and a significand held in a second operand buffer 110. The significands held in first operand buffer 105 and second operand buffer 110 may comprise the 23-bit significand (fraction part) of 32-bit floating-point operands. While 32-bit floating-point operands with 23-bit significands may be employed, those skilled in the art will appreciate that other sizes may be used such as 64-bit floating-point operands with 52-bit significands.

The significands held in first operand buffer 105 and second operand buffer 110 may each have a 1-bit appended on the left to produce a 24-bit significand. These two significands are then fed into multiplying circuit 115. Multiplying circuit 115 assumes that the significands held in first operand buffer 105 and second operand buffer 110 each need to have an implicit leading 1-bit appended on the left as the most significant bit to product a 24-bit significand. The output of multiplying circuit 115 may comprise a 48-bit floating point product 125 of the two 24-bit significands held in first operand buffer 105 and second operand buffer 110.

FIG. 2 shows an exemplary implementation of multiplying circuit 115. Multiplying circuit 115 may add 26 summands; of these, 24 summands may be produced by performing a logical AND of all the bits of the significand corresponding to the non-subprecise operand with each of the bits of the significand corresponding to the subprecise operand. The result of this AND operation is then shifted by a fixed amount corresponding to the position of the bit within the significand corresponding to the subprecise operand. Thus, the leading bit of the significand corresponding to the subprecise operand, which is always a 1, results in a copy of the significand corresponding to the subprecise operand, shifted left by 23 positions, becoming a summand. The rightmost bit of the significand corresponding to the non-subprecise causes the significand corresponding to the subprecise operand, not shifted at all, to be a summand if that rightmost bit is 1, but if it is 0 then the summand is zero. This exemplary implementation of multiplying circuit 115 uses a plurality of intermediate stages 205 through 235 comprising a Wallace tree of 3-to-2 adders followed by a single full adder 240. Those skilled in the art will appreciate that many other ways of implementing a multiplier array, including the use of 4-to-2 adders rather than 3-to-2 adders, may be utilized.

The Wallace tree of the exemplary implementation of multiplying circuit 115 is advantageous because the compensating summand may be presented to multiplying circuit 115 later in time than the significands held in first operand buffer 105 and second operand buffer 110 causing little or no time delay. Thus, one of the plurality of intermediate stages 205–235 may be selected to receive the compensating summand wherein no time delay is introduced by correcting the error. Alternatively, one of the plurality of intermediate stages may be selected to receive the compensating summand such that time consumed by multiplying the subprecise operand and the non-subprecise operand overlaps time consumed in correcting the error. Thus, when this exemplary implementation of multiplying circuit 115 is used in system 100, the overall time delay of the floating-point multiplier may be significantly less than that of existing floating-point multipliers that must normalize a subprecise input that is represented in a denormalized format.

Furthermore, the timing overlap is even more advantageous for floating-point numbers of larger size. This is due to the fact that a greater number of intermediate stages are needed for multipliers that multiply floating-point numbers of larger size. With more intermediate stages consuming more time, the difference between the time consumed by error correction and time consumed by the intermediate stages becomes less significant.

Those skilled in the art will appreciate that multiplying circuit 115 may be implemented by many different circuit elements including, but not limited to programmable logic arrays, ASIC circuits, general memory registers, other addressable memory storage devices or a combination thereof.

System 100, may further comprise a creating circuit 120 for creating the compensating summand. Creating circuit 120 may in turn comprise a determining circuit 140 for determining the position of a delimiter bit and a generating circuit 155. Creating circuit 120 outputs the compensating summand and a logical "1" to multiplying circuit 115.

In one embodiment, creating circuit 120 may comprise a determining circuit 140 that determines the position of a delimiter bit contained within the significand corresponding to the subprecise operand. Determining circuit 140 may include a counting circuit 145 and a first multiplexer 150.

Figure 3:
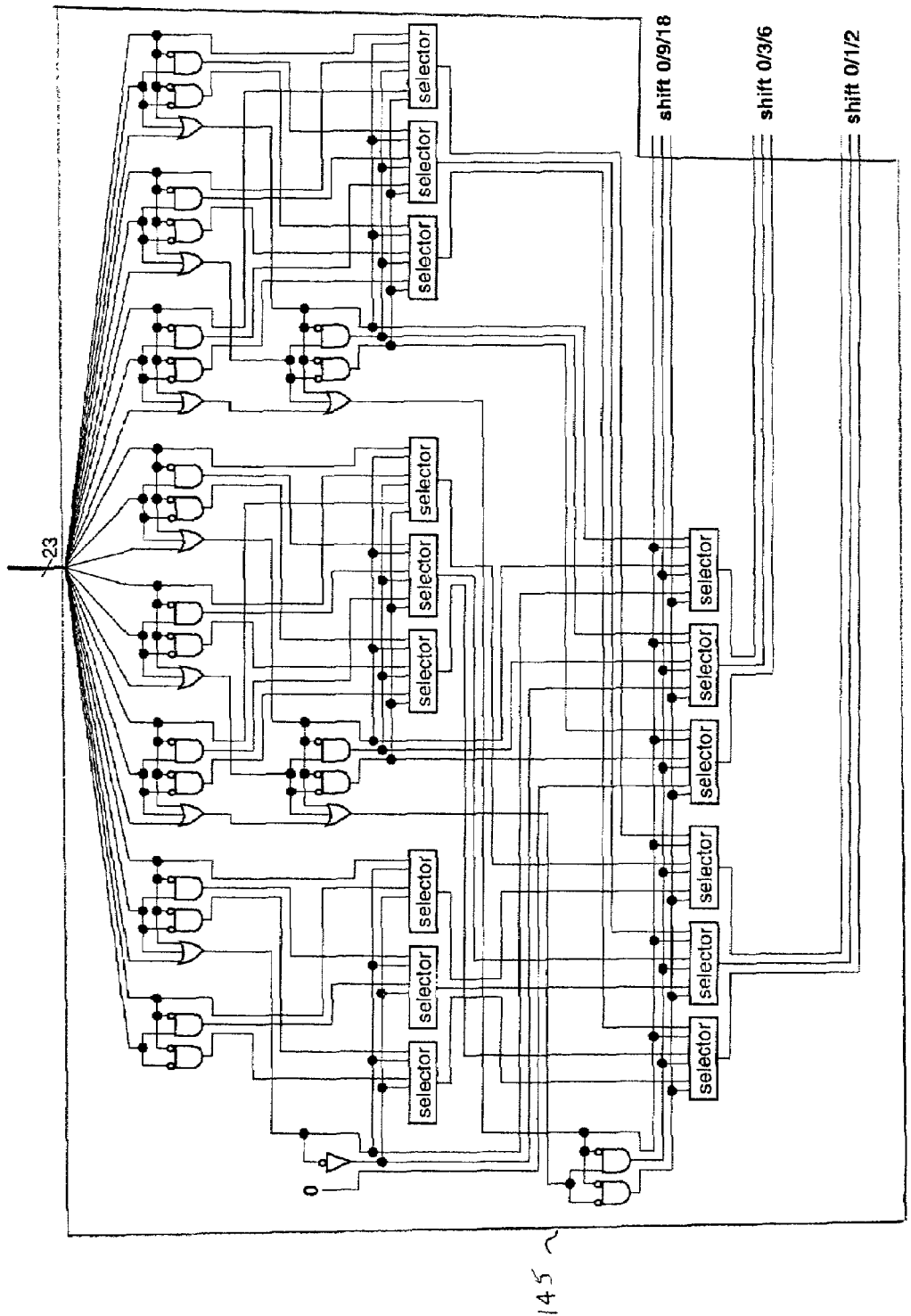
FIG. 3 is a functional block diagram of an exemplary component for counting consistent with an embodiment of the present invention.

FIG. 3 shows an exemplary implementation counting circuit 145. Counting circuit 145 accepts a 23-bit significand in the delimited representation and identifies the position of the rightmost 1-bit. If the significand contains all 0-bits, then component for counting 145 identifies a position to the left of the leftmost of the 23 bits. In one embodiment, this position is encoded as a ternary (base 3) integer, where each ternary digit is encoded in a 1-of-3 binary representation. The three signals, "shift 0/9/18," of which exactly one will be 1-bit, indicate whether 0, 9, or 18 should be an addend. The three signals, "shift 0/3/6," of which exactly one will be 1-bit, indicate whether 0, 3, or 6 should be an addend. And, the three signals, "shift 0/1/2," of which exactly one will be 1-bit, indicate whether 0, 1, or 2 should be an addend. Adding together the three numbers so selected indicates the position of the rightmost 1-bit in the significand input into counting circuit 145, where the rightmost position is position 0. The nine binary signals that encode this ternary number are used to control generating circuit 155.

Generating circuit 155 may include a shifting circuit 160 for shifting the compensating summand, second multiplexer 165, a logical inversion circuit 170 for logically inverting the compensating summand, and a producing circuit 175 for producing a logical "1". Generating circuit 155 calculates the compensating summand utilizing the determined position of the delimiter bit. When calculating the compensating summand, the compensating summand is initially equal to the significand corresponding to the non-subprecise operand.

Shifter circuit 160 receives a representation of the significand of the non-subprecise significand from second multiplexer 165, and the output of counting circuit 145. Shifter circuit 160 shifts the compensating summand, which is initially equal to the significand of the non-subprecise significand, so that the rightmost bit is aligned with the determined delimiter bit position as determined by counting circuit 145.

Figure 4:
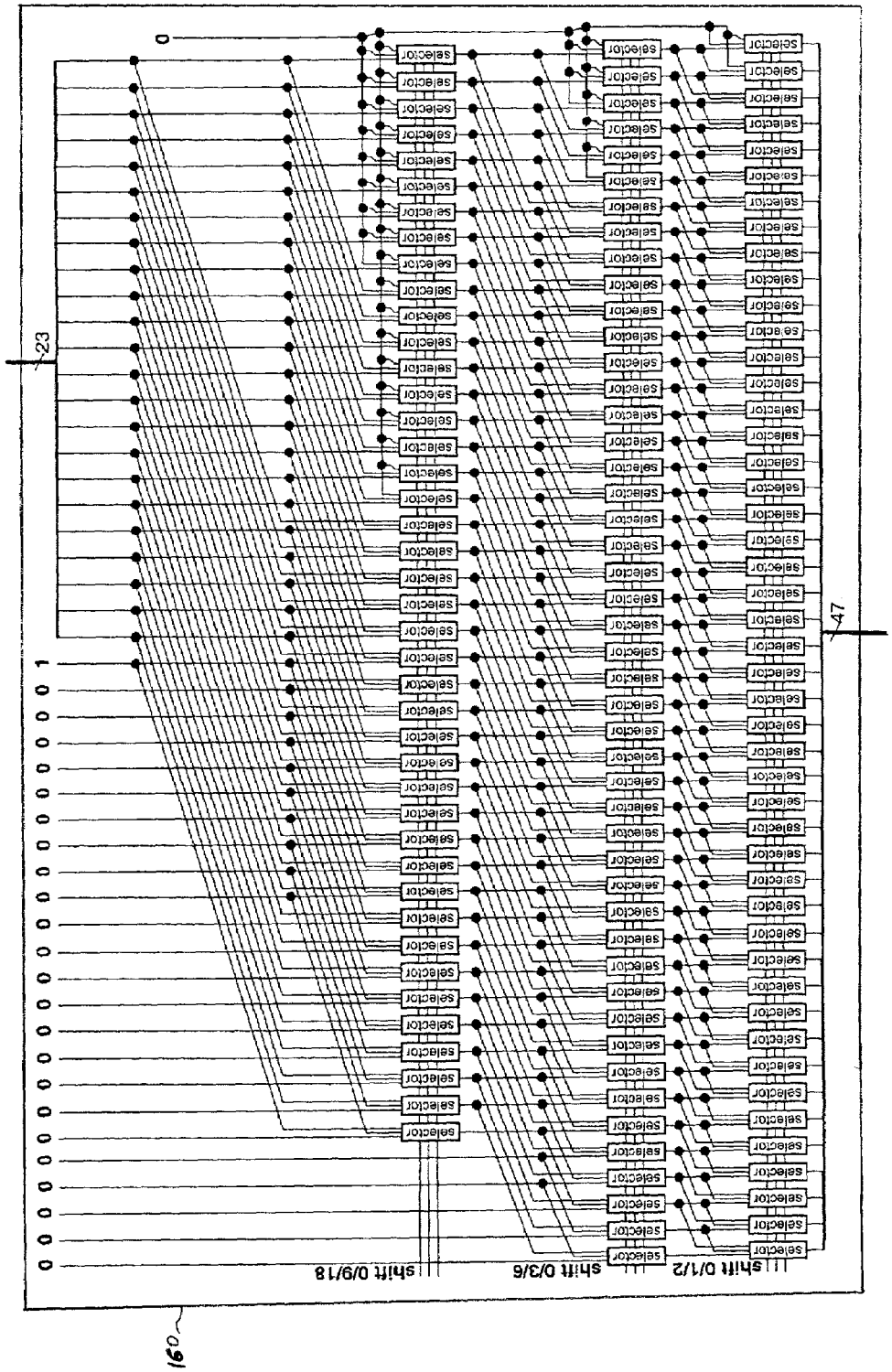
FIG. 4 is a functional block diagram of an exemplary shifter circuit consistent with an embodiment of the present invention.

FIG. 4 shows an exemplary implementation of shifter circuit 160 of FIG. 1. Shifter circuit 160 accepts nine binary signals encoding a ternary number from counting circuit 145, and a 23-bit significand from second multiplexer 165. Shifter circuit 160 appends an implicit 1-bit on the left to produce a 24-bit significand and then shifts that significand to the left by a number of positions equal to the number encoded by the output of counting circuit 145. The result is a 47-bit binary number.

As shown in FIG. 1, logical inversion circuit 170 for logically inverting the compensating summand may comprise an OR gate with inverters on the inputs. The OR gate is further utilized in the situation wherein both operands being multiplied are non-subprecise. This will be described in greater detail below. Those skilled in the art will appreciate that there are many ways to invert a binary summand. Furthermore, producing circuit 175 may comprise a standard buffer or other devices as are known by those skilled in the art. In practice, those of skill in the art may optimize the circuit to account for producing circuit 175 without using actual additional gates.

Creating circuit 120 sends the significand corresponding to the subprecise operand to counting circuit 145 and sends the significand corresponding to the non-subprecise operand to shifter circuit 160. In doing so, system 100 utilizes first multiplexer 150, second multiplexer 165, a signal held in first operand buffer indicator 130 indicating whether first operand buffer 105 contains a subprecise operand, and a signal held in second operand buffer indicator 135 indicating whether second operand buffer 110 contains a subprecise operand.

Still referring to FIG. 1, if the content of first operand buffer 105 is subprecise, then the two multiplexers will cause the content of first operand buffer 105 to be presented to determining circuit 145 and the contents of second operand buffer 110 to be presented to shifter circuit 160. If the content of first operand buffer 105 is not subprecise, then the two multiplexers will cause the contents of second operand buffer 110 to be presented to determining circuit 145 and the content of first operand buffer 105 to be presented to shifter circuit 160. Therefore, if only one of the two contents of first operand buffer 105 and second operand buffer 110 is subprecise, then the subprecise operand is presented to determining circuit 145 and the significand of the other operand is presented to the shifter circuit 160.

If neither first operand buffer 105 and second operand buffer 110 contents are subprecise, then the output of shifter circuit 160 does not matter. In this case, the output of an upper OR gate 180 will be "false," so the output of component for logically inverting will all be "true," thus all "1"s will be presented as the compensating summand. The net effect of this situation is to add zero to product 125 of multiplying circuit 115.

Product 125 of multiplying circuit 115 need not be correct if both operands are subprecise because the floating-point product 125 as a whole will underflow and other logic (not shown) will handle this exceptional case. Thus, if the contents of first operand buffer 105 and second operand buffer 110 are both subprecise, the output of the multiplier array does not matter. In all other cases, the output is the correct product of the inputs and has a leading 1-bit in either the first or second position from the left, so that at most a single-bit shift is needed to normalize the result.

Method for Providing a Floating Point Product

Figure 5:
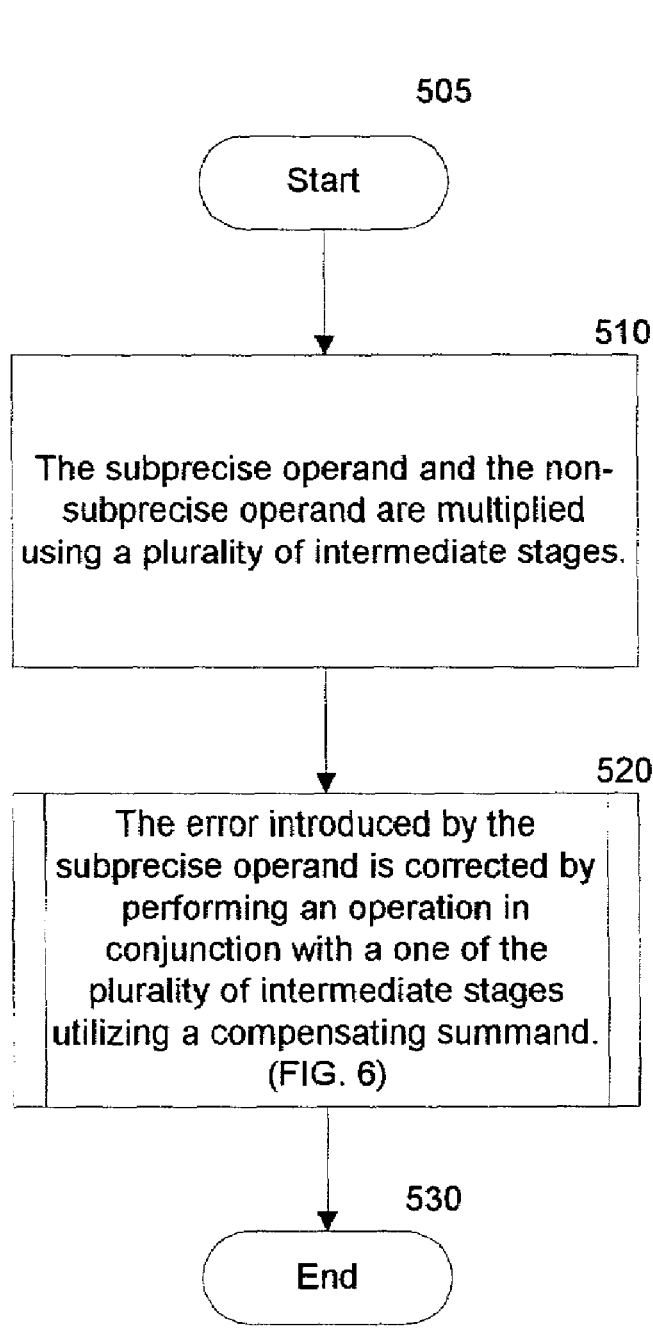
FIG. 5 is a flow chart of an exemplary method for providing a floating point product consistent with an embodiment of the present invention.

In the context of exemplary system 100, FIG. 5 is a flow chart setting forth the general stages involved in an exemplary method 500 for providing a floating point product 125 consistent with an embodiment of the invention. The implementation of the stages of exemplary method 500 will be described in greater detail in FIG. 6 and FIG. 7.

Exemplary method 500 begins at starting block 505 and proceeds to stage 510 where the subprecise operand and the non-subprecise operand are multiplied using a plurality of intermediate stages 205–235. In an embodiment of the invention, the intermediate stages are adding stages, such as a Wallace tree of adders. When neither operand is subprecise, the compensating summand is computed in such a way as to have no net effect on product 125, and product 125 is computed correctly in the same manner as by a conventional multiplier array.

After stage 510 where the subprecise operand and the non-subprecise operand are multiplied using a plurality of intermediate stages 205–235, exemplary method 500 continues to exemplary subroutine 520 where the error introduced by the subprecise operand is corrected by performing an operation in conjunction with a one of the plurality of intermediate stages utilizing the compensating summand. The stages of exemplary subroutine 520 are shown in FIG. 6 and will be described in greater detail below.

From exemplary subroutine 520 where the error introduced by the subprecise operand is corrected, exemplary method 500 ends at stage 530.

Figure 6:
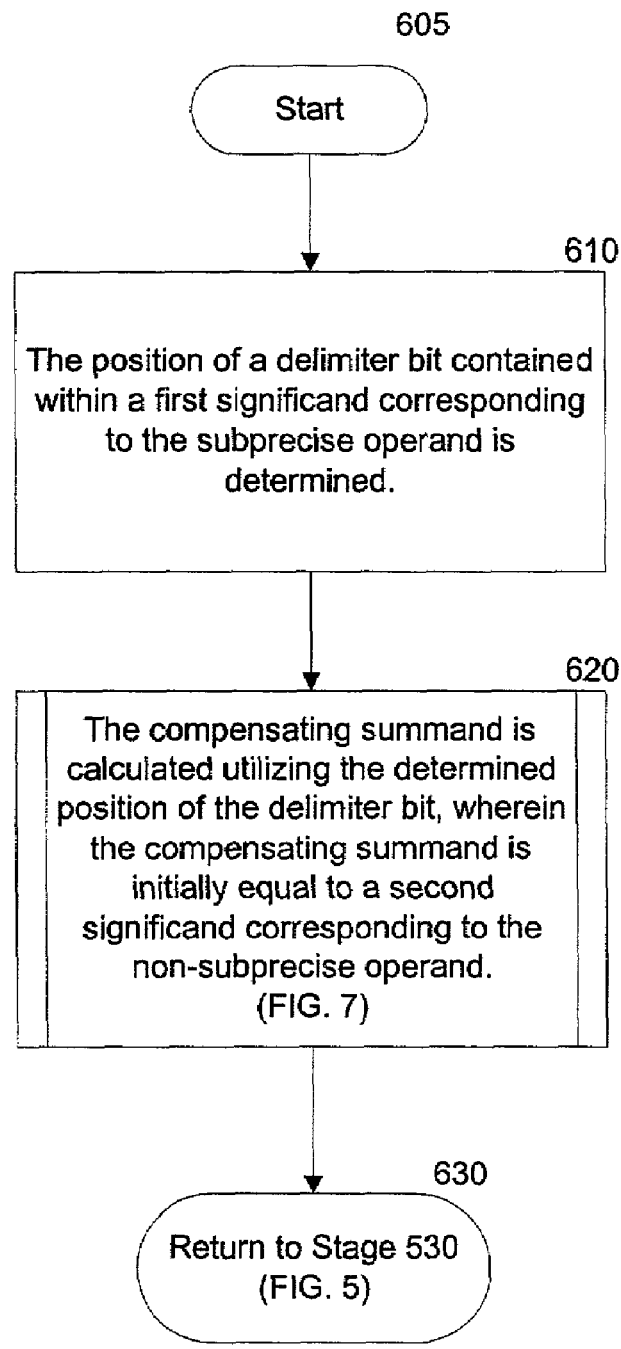
FIG. 6 is a flow chart of an exemplary subroutine used in the method of FIG. 5 for correcting an error introduced by the subprecise operand consistent with an embodiment of the present invention.

FIG. 6 is a flow chart setting forth the general stages involved in the exemplary subroutine 520 of FIG. 5 consistent with an embodiment of the invention. Exemplary subroutine 520 begins at starting block 605 and proceeds to stage 610 where the position of the delimiter bit contained within the significand corresponding to the subprecise operand is determined. When only one operand is subprecise, the delimiter 1-bit is fed into multiplying circuit 115 as if it were a significant bit. Counting circuit 145 determines the position of this delimiter bit.

After the position of the delimiter bit contained within the significand corresponding to the subprecise operand is determined in stage 610, exemplary subroutine 520 advances to exemplary subroutine 620, where the compensating summand is calculated or generated utilizing the determined position of the delimiter bit, wherein the compensating summand is initially equal to the significand corresponding to the non-subprecise operand. The stages of exemplary subroutine 620 are shown in FIG. 7 and will be described in greater detail below.

From exemplary subroutine 620 where the compensating summand is calculated utilizing the determined position of the delimiter bit, wherein the compensating summand is initially equal to the significand corresponding to the non-subprecise operand, exemplary subroutine 520 continues to stage 630 and returns to stage 530 of FIG. 5.

Figure 7:
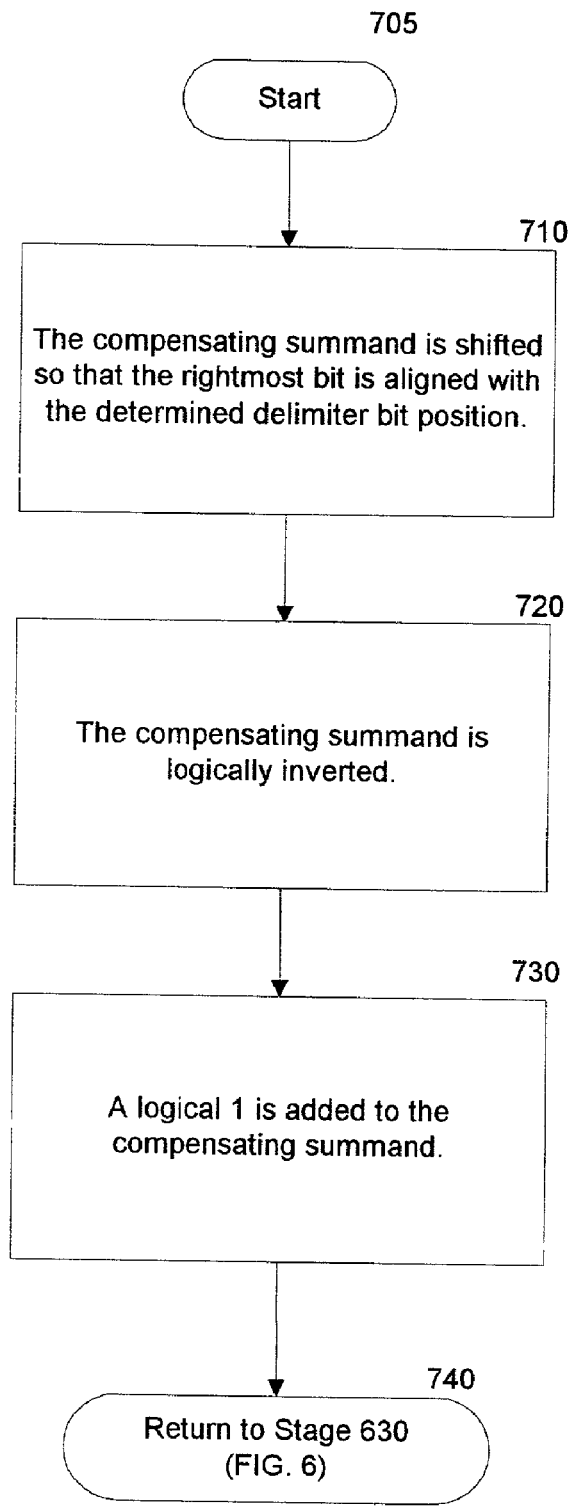
FIG. 7 is a flow chart of an exemplary subroutine used in the subroutine of FIG. 6 for generating the compensating summand consistent with an embodiment of the present invention.

FIG. 7 is a flow chart setting forth the general stages involved in the exemplary subroutine 620 of FIG. 6 consistent with an embodiment of the invention. Exemplary subroutine 620 begins at starting block 705 and proceeds to stage 710 where the compensating summand is shifted so that the rightmost bit is aligned with the determined delimiter bit position.

After the compensating summand is shifted so that the rightmost bit is aligned with the determined delimiter bit position stage 710, exemplary subroutine 620 continues to stage 720, where the compensating summand is logically inverted.

Once the compensating summand is logically inverted in stage 720, exemplary subroutine 620 advances to stage 730, where a logical "1" is added. This is done by providing the output providing circuit 175 to one of the plurality of intermediate stages 205–240 of multiplying circuit 115. Logically inverting all the bits of a binary number and then adding a logical "1", has the effect of numerically negating the number. In the present embodiment, the net effect is to subtract the output of shifter circuit 160 from product 125.

Specifically, the output of shifter circuit 160 is logically inverted, and when a logical "1" is added, the effect is to subtract the input that is not subprecise. This is done at a position determined by the delimiter bit and from product 125 in such a way as to compensate for the fact that the non-significant delimiter bit was fed into multiplying circuit 115 as if it were significant. The net effect is to compute product 125 correctly. Because the compensating summand can be presented to multiplying circuit 115 later than the contents of first operand buffer 105 and second operand buffer 110, some or all of the time delay of first multiplexer 150, second multiplexer 165, counting circuit 145, and shifter circuit 160 is advantageously overlapped with operation time of early stages of the plurality of intermediate stages 205–240 of multiplying circuit 115. When multiplying circuit 115 is used within system for providing a floating point product 100, the overall delay of the floating-point multiplier may be significantly less than that of existing floating-point multipliers that must normalize a subprecise input that is represented in a denormalized format.

From stage 730 where a logical "1" is added, exemplary subroutine 620 continues to stage 740 and returns to stage 630 of FIG. 6.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

One of ordinary skill in the art will recognize that other formats and bit patterns could be used to represent the floating point operand formats without departing from the principles of the present invention. One of ordinary skill in the art will also recognize that the floating point status information contained in the operands could easily be represented by other bit combinations (not shown) without departing from the principles of the present invention. For example, more or fewer bits could be used, a subset or superset of the exemplary status bits could be used, or the most significant bits of an operand (or some other subset of bits) could be used to indicate the floating point status information, instead of the least significant bits illustrated.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing a floating point product, comprising:
   multiplying a subprecise operand and a non-subprecise operand using a plurality of intermediate stages; and
   correcting an error introduced by the subprecise operand by:
      performing an operation in conjunction with a one of the plurality of intermediate stages utilizing a compensating summand;
      determining the position of a delimiter bit contained within a first significand corresponding to the subprecise operand; and generating the compensating summand utilizing the determined position of the delimiter bit, wherein the compensating summand is initially equal to a second significand corresponding to the non-subprecise operand.

2. The method of claim 1, wherein multiplying the subprecise operand and the non-subprecise operand comprises using a multiplier array.

3. The method of claim 1, wherein generating the compensating summand further comprises:
shifting the compensating summand so that the rightmost bit is aligned with the determined delimiter bit position;
logically inverting the compensating summand; and
adding a logical 1.

4. The method of claim 1, wherein the subprecise operand is represented using a delimited normalized format with an implicit leading 1-bit.

5. The method of claim 1, wherein the one of the plurality of intermediate stages is selected wherein a substantial time delay to correct the error is avoided.

6. The method of claim 1, wherein time consumed by multiplying the subprecise operand and the non-subprecise operand overlaps time consumed in correcting the error.

7. A system for providing a floating point product comprising:
a multiplying circuit for multiplying a subprecise operand and a non-subprecise operand using a plurality of intermediate stages, wherein an error introduced by the subprecise operand is corrected by performing an operation in conjunction with a one of the plurality of intermediate stages utilizing a compensating summand; and
a creating circuit for creating the compensating summand comprising:
a determining circuit for determining the position of a delimiter bit contained within a first significand corresponding to the subprecise operand; and
a generating circuit for generating the compensating summand utilizing the determined position of the delimiter bit, wherein the compensating summand is initially equal to a second significand corresponding to the non-subprecise operand.

8. The system of claim 7, wherein the multiplying circuit comprises a multiplier array.

9. The system of claim 8, wherein the multiplier array uses 3-to-2 adders.

10. The system of claim 7, wherein the generating circuit further comprises:
a shifting circuit for shifting the compensating summand so that the rightmost bit is aligned with the determined delimiter bit position;
a logical inversion circuit for logically inverting the compensating summand; and
a producing circuit for producing a logical 1 to the compensating summand.

11. The system of claim 7, wherein the subprecise operand is represented using a delimited normalized format with an implicit leading 1-bit.

12. The system of claim 7, wherein the one of the plurality of intermediate stages is selected wherein a substantial time delay to correct the error is avoided.

13. The system of claim 7, wherein time consumed by multiplying the subprecise operand and the non-subprecise operand overlaps time consumed in correcting the error.

14. A computer-readable medium on which is stored a set of instructions for providing a floating point product, which when executed perform stages comprising:
multiplying a subprecise operand and a non-subprecise operand using a plurality of intermediate stages; and
correcting an error introduced by the subprecise operand by:
performing an operation in conjunction with a one of the plurality of intermediate stages utilizing a compensating summand;
determining the position of a delimiter bit contained within a first significand corresponding to the subprecise operand; and
calculating the compensating summand utilizing the determined position of the delimiter bit, wherein the compensating summand is initially equal to a second significand corresponding to the non-subprecise operand.

15. The computer-readable medium of claim 14, wherein generating the compensating summand further comprises:
shifting the compensating summand so that the rightmost bit is aligned with the determined delimiter bit position;
logically inverting the compensating summand; and
adding a logical 1.

16. The computer-readable medium of claim 14, wherein the subprecise operand is represented using a delimited normalized format with an implicit leading 1-bit.

17. The computer-readable medium of claim 14, wherein the one of the plurality of intermediate stages is selected wherein a substantial time delay to correct the error is avoided.

18. The computer-readable medium of claim 14, wherein time consumed by multiplying the subprecise operand and the non-subprecise operand overlaps time consumed in correcting the error.

* * * * *